United States Patent [19]
Kublick

[11] 3,792,339
[45] Feb. 12, 1974

[54] CONTROL DEVICE FOR AN INVERTED CONVERTER

[75] Inventor: Christian Kublick, Erlangen, Germany

[73] Assignee: Siemens Aktiengesellschaft, Munich, Germany

[22] Filed: Mar. 12, 1973

[21] Appl. No.: 340,074

[30] Foreign Application Priority Data
Mar. 16, 1972 Germany............................ 2212791

[52] U.S. Cl........................ 321/18, 321/40, 321/41
[51] Int. Cl. ............................................. H02m 7/00
[58] Field of Search........................... 321/18, 40, 41

[56] References Cited
UNITED STATES PATENTS

| | | | |
|---|---|---|---|
| 3,260,912 | 7/1966 | Gregory................. | 321/18 |
| 3,323,033 | 5/1967 | Lorentzen et al................. | 321/18 X |
| 3,325,716 | 6/1967 | Gomi................. | 321/18 X |
| 3,363,141 | 1/1968 | Pelly et al.................. | 321/18 X |
| 3,364,413 | 1/1968 | Abraham................. | 321/18 |
| 3,584,286 | 6/1971 | Randall................. | 321/40 X |
| 3,746,966 | 7/1973 | Torok et al................. | 321/40 |

Primary Examiner—William M. Shoop, Jr.
Attorney, Agent, or Firm—Kenyon & Kenyon Reilly Carr & Chapin

[57] ABSTRACT

This invention is an improved control device for an inverted converter. Pulses for the control of the inverted converter are derived from a sawtooth voltage produced by a sawtooth voltage generator. The sawtooth voltage generator also produces auxiliary pulses, which represent the time of the reversal points of the sawtooth voltage. The duration between reversal points corresponds to a half-period of the sawtooth voltage. These auxiliary pulses and pulses derived from the sawtooth voltage generator by a comparator stage are applied to a switching circuit having a memory stage. The switching circuit produces at its output pulse trains containing only one pulse per period of the sawtooth voltage. By means of the control device according to this invention, interruptions in the pulse train supplied to the inverted converter due to sudden changes in the voltage supply are avoided.

13 Claims, 3 Drawing Figures

CONTROL DEVICE FOR AN INVERTED CONVERTER

BACKGROUND OF THE INVENTION

1. Field of the Invention

This invention relates to a control device for an inverted converter. The control device generates pulses for the control of the inverted converter from a sawtooth voltage.

2. Description of the Prior Art

Control devices for inverted converters are known in the prior art. In these prior art control devices, it is possible that an interruption in the pulse train from the control device to the inverted converter can occur as a result of a sudden change in the regulated voltage. This required voltage, for example, can be the inverted converter output voltage or a control vltage derived from the output voltage from a control circuit. This is a disadvantage, for example, when the output voltage of the inverted converter is an A.C. voltage and the output current is not in phase with the output voltage. In this situation, it is possible that when the current passes normally through its zero crossover, no firing pulse is present at the thyristor that should receive the current, causing an undesirable gap in the current and a malfunctioning of the inverted converter. The problem to which this invention is addressed is to prevent an interruption of the pulse trains from the control device to the inverted converter due to sudden changes in the regulated voltage or the control voltage.

SUMMARY OF THE INVENTION

The purpose of this invention is to provide a control device adapted for use with an inverted converter where the control device prevents interruptions in the pulse trains from the control device to the inverted converter due to sudden changes in the regulated voltage or the control voltage. According to this invention the foregoing problem in prior art control devices is solved by providing a sawtooth voltage generator which generates a sawtooth voltage and auxiliary pulses, representing the location of the points of reversal of the sawtooth voltage, applying these auxiliary pulses and the pulses derived from the sawtooth voltage to a switching stage having a memory stage, which, by means of a logic circuit, produces pulse trains at its output containing only one pulse per period of the sawtooth voltage.

The control device of this invention adapted for use with an inverted converter comprises: a sawtooth voltage generator which generates a sawtooth voltage having upper and lower reversal points and which also generates auxiliary pulse trains; a regulator which generates a comparison voltage; a comparator stage which receives the sawtooth voltage from the sawtooth voltage generator and the comparison voltage from the regulator, the comparator stage having outputs at which pulse trains are produced; and a switching circuit which receives pulse trains from the comparator stage and auxiliary pulse trains from the sawtooth voltage generator, the pulse trains from the comparator stage being derived from the sawtooth voltage, the auxiliary pulses of the auxiliary pulse train representing the time of the reversal points of the sawtooth voltage, the switching circuit producing pulse trains which contain only one pulse per period of the sawtooth voltage and which are supplied to the inverted converter.

Preferably the switching circuit is constructed of two gates followed by a memory stage. The memory stage of the switching circuit can be set by the applied pulse trains from the comparator stage and auxiliary pulse trains from the sawtooth voltage generator in only one direction during one leg of the sawtooth voltage and in only the other direction during the following leg of the sawtooth voltage.

The sawtooth voltage generator produces two trains of auxiliary pulse trains. The duration of each auxiliary pulse of the auxiliary pulse train from the memory stage of the sawtooth voltage generator corresponds substantially in time to the separation between two reversal points of the sawtooth voltage, which amounts to a half-period in the case of a symmetrical sawtooth voltage. The leading edges of the auxiliary pulses of one auxiliary pulse train coincide with the upper reversal points of the sawtooth voltage. The leading edges of the auxiliary pulses of the second auxiliary pulse train coincide with the lower reversal points of the sawtooth voltage.

The switching circuit has two NAND-gates, a first NAND-gate and a second NAND-gate, each NAND-gate having two inputs.

One pulse train from the comparator stage, which is derived from the sawtooth voltage, is applied directly to the first input of the first NAND-gate in the switching circuit. The other pulse train from the comparator stage, which is also derived from the sawtooth voltage, is applied through an inverter stage, to the first input of the second NAND-gate in the switching circuit. The second input of each NAND-gate in the switching circuit receives one of the auxiliary pulse trains from the memory stage of the sawtooth voltage generator. The outputs of the first and second NAND-gates are connected to the input of the memory stage of the switching circuit.

The sawtooth voltage generator includes a first limit stage, a second limit stage and a memory stage. It is the memory stage of the sawtooth voltage generator which produces the auxiliary pulse trains. The memory stage produces a first auxiliary pulse train and a second auxiliary pulse train. The first auxiliary pulse train corresponds substantially in time to the upper reversal points of the sawtooth voltage. The second auxiliary pulse train corresponds substantially in time to the lower reversal points of the sawtooth voltage.

The limit stages produce signals or pulse trains which are supplied to the memory stage of the sawtooth voltage generator. The first limit stage produces a first pulse train and the second limit stage produces a second pulse train, each pulse train having pulses in the form of spikes. The pulses of the first pulse train substantially correspond in time to the upper reversal points of the sawtooth voltage. The pulses of the second pulse train substantially correspond in time to the lower reversal points of the sawtooth voltage. The auxiliary pulse trains from the memory stage of the sawtooth voltage generator are derived from the first and second pulse trains from the first and second limit stages.

The sawtooth voltage generator also includes an integrator, a reference voltage and a pair of switches. The integrator has inputs and an output at which the sawtooth voltage is generated having upper and lower reversal points. The switches transmitts positive or negative input voltage alternately to the inputs of the integrator. Said input voltages are proportional to the reference voltage. These datum voltage of the limit stages are also proportional to the reference voltage. The switches are controlled by the auxiliary pulse trains derived from the pulse trains from the limit stages. The switches are alternately opened and closed whenever a reversal point of the sawtooth voltage is reached.

The sawtooth voltage generator further includes a first and second voltage divider. The reference voltage is applied to each of the voltage dividers. The voltage derived from the first voltage divider is used as at least one of the input voltages applied alternately to the input of the integrator. The voltage from the second voltage divider is applied to one of the limit stages as a switching reference voltage or datum voltage and the pulse trains from this limit stage are derived from the voltage from this second voltage divider. The sawtooth voltage generator also includes an inverting amplifier for the integrator. At least one of the input voltages which is applied alternately to the integrator is derived from this inverting amplifier.

The control device of this invention also includes a comparison voltage which is used in conjunction with the comparator stage. The comparator stage has a first input and a second input. The sawtooth voltage from the sawtooth voltage generator is applied to the first input of the comparator stage. The comparison voltage is applied to the second input of the comparator stage. The comparison voltage is limited by an upper and lower limiting voltage whose magnitude lies between the reversal points of the sawtooth voltage. The upper and lower limiting voltages are proportional to the reference voltage. The regulator includes a regulator amplifier and at least one voltage divider. The voltage divider provides the regulator amplifier with limiting voltages to limit the comparison voltage.

The reference voltage may be the supply voltage. The input voltages to the integrator and the switching reference voltages which are used in conjunction with the limit stages are proportional to the reference voltage. One advantage of the control device of this invention is that the frequency of the sawtooth voltage generated by the sawtooth voltage generator is independent of the reference voltage. The sawtooth voltage generator also provides a simple means for generating the auxiliary pulses which represent the reversal points of the sawtooth voltage.

As a result, the control device of this invention produces pulse trains for the control of the controlled rectifying elements of the inverted converter. The pulse trains contain only one pulse per period of the sawtooth voltage and are independent of sudden changes in the regulated voltage or control voltage.

DETAILED DESCRIPTION

Figure 1:
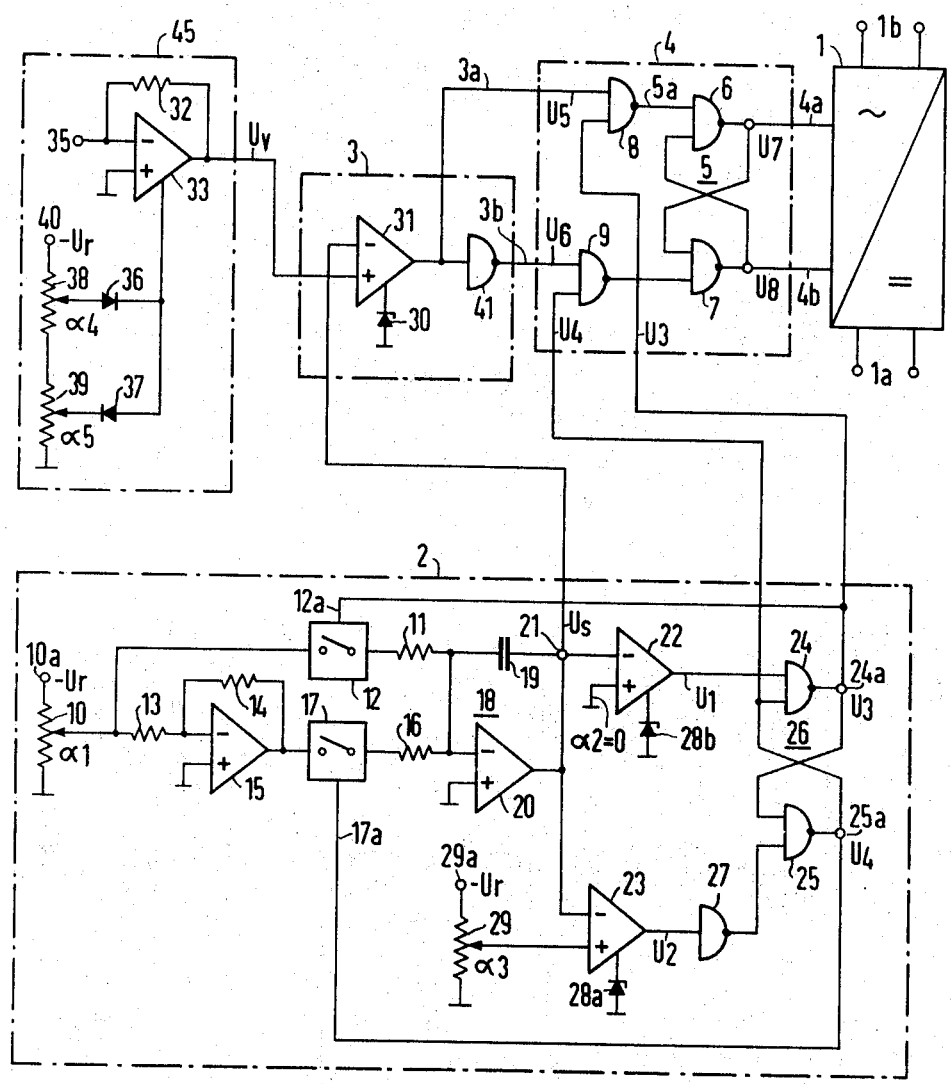
FIG. 1 is a schematic circuit diagram of the control device of this invention electrically connected to an inverted converter.

Referring to FIG. 1, the control device of this invention for an inverted converter comprises a sawtooth voltage generator 2, a comparator stage 3, a switching circuit 4 having a memory stage 5, and a voltage regulator 45. The control device of this invention is electrically connected to an inverted converter 1 and supplies pulse trains for control of the controlled rectifier elements of the inverted converter 1. The function of the inverted converter 1 is to receive direct current (D.C.) at input terminals 1a and to change this current to alternating current (A.C.) which is provided at output terminals 1b.

The sawtooth voltage generator 2 generates a sawtooth waveform voltage $U_s$ which is received by the comparator stage 3. The comparator stage 3 generates complementary pulse trains $U_5$ and $U_6$ at the outputs 3a and 3b of the comparator stage 3. These complementary pulse trains $U_5$ and $U_6$ were derived from the sawtooth voltage as a function of the control voltage $U_v$ from the regulator 45.

The complementary pulse trains $U_5$ and $U_6$ from the outputs 3a and 3b of the comparator stage 3 are applied to a switching circuit 4. The memory stage 5 of the switching circuit 4 is constructed in a known manner using NAND-gates 6 and 7.

Comparator stage 3 supplies one pulse train $U_5$ or $U_6$ to one input of each of the NAND-gates 8 and 9 of switching circuit 4. The outputs of NAND-gates 8 and 9 are supplied to the inputs 5a and 5b of NAND-gates 6 and 7 in memory stage 5. The output of NAND-gate 8 is supplied to the input 5a of NAND-gate 6 in memory stage 5. The output of NAND-gate 9 is supplied to the input 5b of NAND-gate 7 in memory stage 5.

A train of auxiliary pulses $U_3$ and $U_4$ from the sawtooth voltage generator 2 are supplied to the other inputs of each of NAND-gates 8 and 9. One train of auxiliary pulses $U_3$, applied to NAND-gate 8, represents the time of the upper reversal points of the sawtooth voltage $U_s$. The other auxiliary pulse train $U_4$, applied to the NAND-gate 9, represents the time of the lower reversal points of the sawtooth voltage. The duration of the auxiliary pulses of auxiliary pulse train $U_3$ and $U_4$ substantially correspond to the separation between the reversal points of the sawtooth voltage $U_s$ and the leading and lagging edges of the auxiliary pulses $U_3$ and $U_4$ coincide substantially with the corresponding reversal points of the sawtooth voltage $U_s$ as will be explained in more detail subsequently.

Referring to the following truth table, memory stage 5 can respond to pulses from the comparator stage 3 in only one direction during one leg of the sawtooth voltage $U_s$ and can respond only once in the other direction during the following leg of the sawtooth voltage $U_s$.

TRUTH TABLE

| NAND-gate 8 inputs | | NAND-gate 9 inputs | | Memory 5 inputs | | Memory 5 outputs | |
|---|---|---|---|---|---|---|---|
| $U_3$ | $U_5$ | $U_4$ | $U_6$ | 5a | 5b | $U_7$ | $U_8$ |
| 0 | 0 | 1 | 1 | 1 | 0 | 0 | 1 |
| 0 | 1 | 1 | 0 | 1 | 1 | no change | no change |
| 1 | 1 | 0 | 0 | 0 | 1 | 1 | 0 |
| 1 | 0 | 0 | 1 | 1 | 1 | no change | no change |

As a result, two complementary pulse trains $U_7$ and $U_8$ are obtained at the outputs 4a and 4b of the switching circuit 4. These complementary pulse trains $U_7$ and $U_8$ at outputs 4a and 4b contain only one pulse per period of the sawtooth voltage $U_s$. Sudden changes in the control or comparison voltage $U_v$ cannot cause an interruption in the pulse train $U_7$ and $U_8$ at outputs 4a and 4b being supplied to the inverted converter 1 during the period of the sawtooth voltage. Sudden changes in the control voltage $U_v$ can influence the memory stage 5 of the switching circuit 4 only if there has been no cross over between the control voltage $U_v$ and the sawtooth voltage $U_s$.

The sawtooth voltage generator 2 generates a sawtooth voltage $U_s$ the frequency of which is independent of the reference voltage $U_r$. The sawtooth voltage generator 2 also generates auxiliary pulses $U_3$ and $U_4$ which are supplied to the switching circuit 4.

A negative reference voltage $U_r$ is applied to terminal 10a of voltage divider 10. This negative reference voltage can be the supply voltage. The voltage from voltage divider 10 is applied to a first switch 12 and to the input of inverting amplifier 15 through resistor 13. The resistor 14 of inverting amplifier 15 provides negative feedback. The output of amplifier 15 is applied to a second switch 17. Switches 12 and 17 are operated by means of control inputs 12a and 17a.

If switch 12 is closed and switch 17 is open, a negative voltage appears at the input of integrator 18. Resistor 11 of integrator 18 causes a negative current to enter integrator 18. If switch 17 is closed and switch 12 is open, a positive voltage appears at the input of integrator 18. As a result of resistor 16 of integrator 18, a positive current enters integrator 18. The order of arrangement of switch 12 and resistor 11 and the order of arrangement of switch 17 and resistor 16 can be reversed. These input voltages applied to integrator 18 are proportional to the reference voltage $U_r$.

Integrator 18 has an amplifier 20 with a capacitor 19 as a feedback element. The output at terminal 21 of integrator 18 is a sawtooth voltage $U_s$ that either rises or falls linearly with time, depending upon the polarity of the integrator input voltage.

The sawtooth voltage $U_s$ from output terminal 21 of integrator 18 within sawtooth voltage generator 2 is applied to comparator stage 3 and is also applied to the two limit stages 22 and 23. On reaching an upper or lower switching reference voltage, these limit stages 22 and 23 feed a spike pulse $U_1$ and $U_2$ to memory stage 26 of the sawtooth voltage generator 2. The memory stage 26 of the sawtooth voltage generator 2 comprises NAND-gates 24 and 25. An inverter stage 27 is also included between limit stage 23 and memory stage 26.

Memory stage 26 of sawtooth voltage generator 2 provides at its outputs 24a and 25a auxiliary pulse trains $U_3$ and $U_4$ which represent the time of the reversal points of the sawtooth voltage $U_s$. The outputs 24a and 25a of memory stage 26 of the sawtooth voltage generator 2 are connected with the inputs of the NAND-gates 8 and 9 of the switching circuit 4. The outputs 24a and 25a of the memory stage 26 of sawtooth voltage generator 2 are also connected to the control inputs 12a and 17a of switches 12 and 17.

Switches 12 and 17 are alternately opened and closed by the auxiliary pulse trains $U_3$ and $U_4$ from memory stage 26 whenever the sawtooth voltage $U_s$ from integrator output terminal 21 reaches one of the switching reference voltages applied to limit stages 22 and 23. If, for example, switch 12 is closed and switch 17 is opened, there is a negative input voltage at integrator 18. There is a rising voltage at integrator output terminal 21. When the upper switching reference voltage is reached, limit stage 22 generates a pulse $U_1$ which produces auxiliary pulses $U_3$ and $U_4$ from memory stage 26 which close switch 17 and open switch 12.

Now there is a positive voltage at the input of the integrator 18. There is a falling voltage at the output terminal 21 of integrator 18 until the lower switching reference voltage is reached and limit stage 23 generates a pulse $U_2$ which produces auxiliary pulses $U_3$ and $U_4$ from memory stage 26 which operate switches 12 and 17 again. Thus, the upper and lower switching reference voltages at limit stages 22 and 23 determine the upper and lower reversal points of the sawtooth voltage $U_s$. The slope of the leg of the sawtooth voltage $U_s$ is determined by the positive or negative integrator input voltages and currents.

The limit stages 22 and 23 are differential amplifiers, limited by limiting diodes 28a and 28b. The second input to limit stage 23 is from the arm of voltage divider 29. The terminal 29a of voltage divider 29 is connected to reference voltage $U_r$. The second input of limit stage 22 is at zero potential. Thus, the difference between the switching reference voltages for limit stages 22 and 23 is proportional to the reference voltage $U_r$. In an alternate embodiment which deviates from FIG. 1, the same proportionality for the switching reference voltages could be obtained if the second input of limit stage 22 were connected to the arm of a voltage divider, the terminals of which were connected to reference voltage $U_r$ or a voltage proportional to it.

Comparator stage 3 has an amplifier 31 limited by limiting diode 30. The first input to amplifier 31 is the sawtooth voltage $U_s$ from output terminal 21 of integrator 18. The second input to amplifier 31 receives the comparison or control voltage $U_v$ obtained from regulator amplifier 33. Regulator amplifier 33 has resistor 32 as a feedback element. Resistor 32 may also be replaced by a combination of resistive and reactive elements.

A control error voltage is supplied to input terminal 35 of regulator amplifier 33. This control error voltage can be formed, for example, from a desired voltage and an actual voltage which can be, for example, the output voltage from output terminal 1b of A.C. inverter converter 1.

To achieve limitation, the regulator amplifier 33 receives limiting voltages from voltage dividers 38 and 39 through diodes 36 and 37. A negative reference voltage $U_r$ is applied to terminal 40 of voltage divider 38. These limiting voltages are proportional to reference voltage $U_r$ and have proportionality factors of $\alpha 4$ and $\alpha 5$. Because of these limiting voltages from voltage dividers 38 and 39, the comparison or control voltage $U_v$ supplied from regulator 45 to comparator stage 3 is always between the upper and lower reversal points of sawtooth voltage $U_s$. This is true when $\alpha_4 < \alpha_3$; $\alpha_5$ is $\neq 0$ and $\alpha_2 = 0$.

Thus, at least one crossover point between the rising and falling slopes of the sawtooth voltage $U_s$ and the control voltage $U_v$ is always obtained. As a result, at least one pulse per period of the sawtooth voltage $U_s$ is obtained, appearing at output 3a and 3b of comparator 3. The leading edge of the pulse trains $U_5$ and $U_6$ coincide with one crossover point and the lagging edge of pulse trains $U_5$ and $U_6$ coincides with the following crossover point. Referring to FIG. 1, the output of amplifier 31 is followed by inverter stage 41. As a result, two complementary pulse trains $U_5$ and $U_6$ are obtained at the outputs 3a and 3b of comparator stage 3 and are fed to switching circuit 4.

The sawtooth voltage $U_s$ from integrator 18 is expressed by the following equation:

$$U_s = \frac{1}{R_i \cdot C} \int_{t_1}^{t_2} \alpha_i \cdot U_r \cdot dt$$

In the above equation and in subsequent equations, C is the capacitance of capacitor 19. $R_i$ is the resistance of any resistor, the reference number of which is used as the subscript. $\alpha_i$ designates the proportionality factors between the reference voltage $U_r$ and the alternately applied input voltages to integrator 18 or the switching reference voltages for limit stages 22 and 23. These proportionality factors $\alpha_i$ are determined in this embodiment by a voltage divider.

In the foregoing equation for the sawtooth voltage $U_s$, $R_i$ is replaced by $R_{11}$ for a rising slope of sawtooth voltage $U_s$ and by $R_{16}$ for a falling slope of sawtooth voltage $U_s$. For a rising slope, $\alpha_i$ equals $\alpha_1$, the proportionality factor provided by the setting of voltage divider 10. For a falling slope, $\alpha_i$ equals $\alpha_1 \cdot R_{14}/R_{13}$.

If the switching reference voltage for limit stage 22 is derived by a voltage divider 10 from the reference voltage $U_r$ and if $\alpha_2$ and $\alpha_3$ are the proportionality factors for the switching reference voltages for the limit stages 22 and 23, then for an operating time $t_s$ of the rising slope of the sawtooth voltage $U_s$, $$(\alpha_2 + \alpha_3) \cdot U_r = t_s/R_{11} \cdot C\, \alpha_1 \cdot U_r\; t_s = \alpha 2 + \alpha 3/\alpha 1 \cdot R_{11} \cdot C$$

and for a duration time $t_f$ of the falling slope of the sawtooth voltage $U_s$, $$(\alpha_2 + \alpha_3) \cdot U_r = t_f/R_{16} \cdot C \cdot R_{14}/R_{13} \cdot \alpha_1 \cdot U_r\; t_f = [(\alpha 2 + \alpha 3)/(\alpha 1 \cdot R_{14}/R_{13})] \cdot R_{16} \cdot C$$

The frequency $f$ of the sawtooth voltage $U_s$ is expressed by the following equation:

$$1/f = t_s + t_f = \alpha 2 + \alpha 3/\alpha 1\; (R_{11} \cdot C + R_{14}/R_{13} \cdot R_{16} \cdot C)$$

This equation for the frequency $f$ of the sawtooth voltage $U_s$ is independent of the reference voltage $U_r$. Thus, the sawtooth voltage generator 2 has the advantage of producing a frequency which is independent of the reference voltage $U_r$. The frequency f is determined by the resistance and capacitance values. This advantage makes it unnecessary to have separate stabilization of the reference voltage $U_r$. In addition, the sawtooth voltage generator 2 produces auxiliary pulse trains $U_3$ and $U_4$ for the switching circuit 4 in the simple manner which has been explained. Thus, the sawtooth voltage generator 2 is particularly suitable for use in the control device of this invention.

The frequency f of the sawtooth voltage $U_s$ can be varied over a wide range by adjustment of the voltage divider 10 which changes the proportionality factor $\alpha_1$, independent of the reference voltage $U_r$ and without the necessity of stabilizing the reference voltage.

Figure 2:
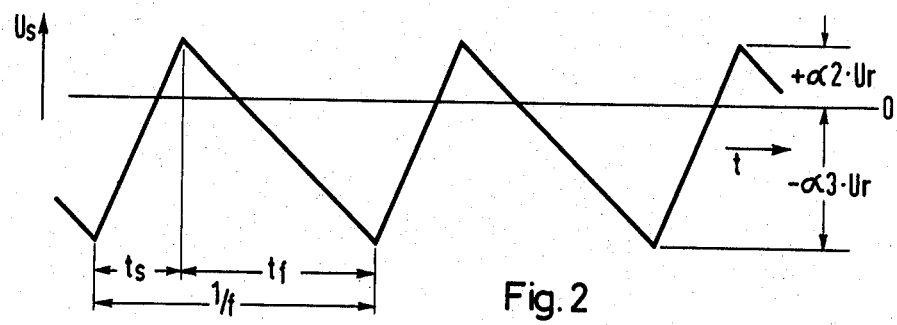
FIG. 2 is a diagram of the variation of the sawtooth voltage $U_s$, produced within the control device shown in FIG. 1, against time.
Figure 3:
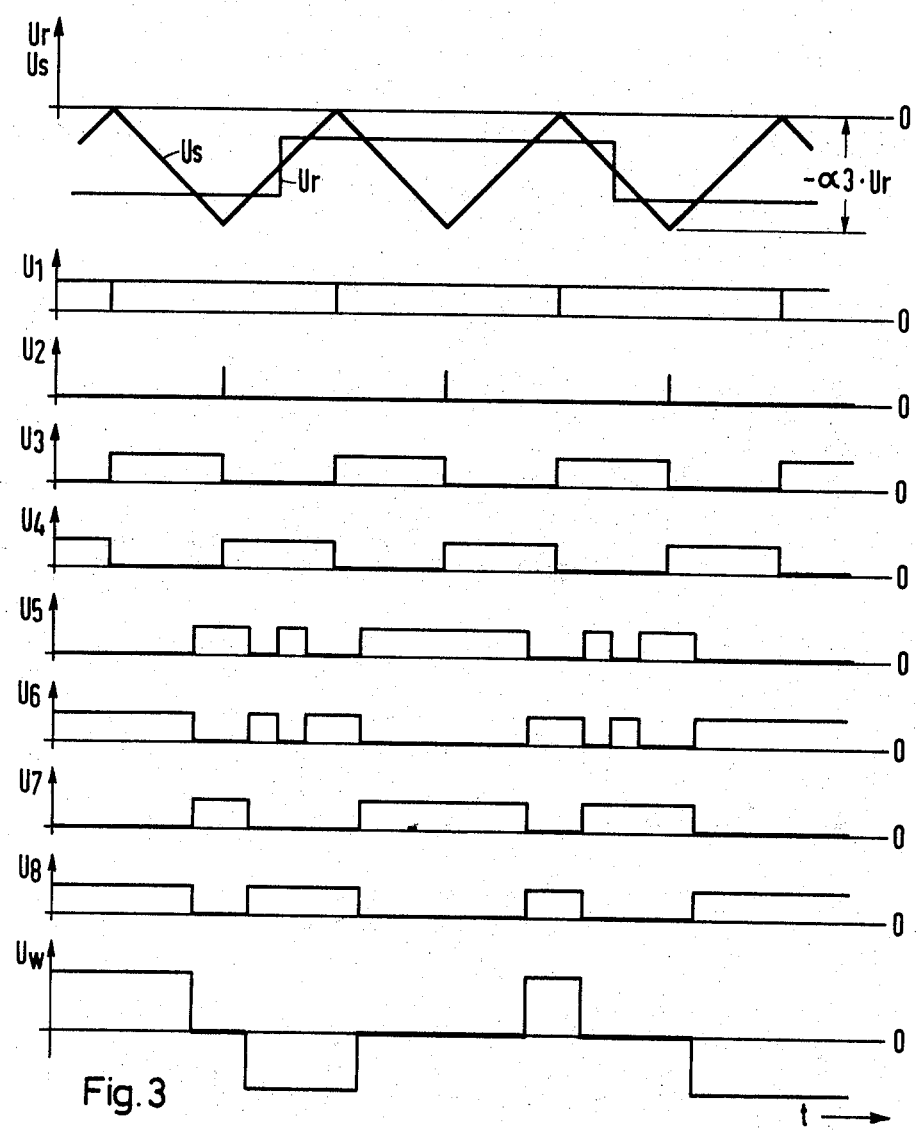
FIG. 3 is a diagram illustrating voltages and pulse trains which appear at designated points in the control device shown in FIG. 1 and their time relationship with one another.

FIG. 2 is a diagram of the variation of the sawtooth voltage $U_s$ versus time, as obtained at the output terminal 21 of integrator 18. The separation between the reversal points of the sawtooth voltage $U_s$ is given by the magnitude of the sum of the products $\alpha_2 \cdot U_r$ and $\alpha_3 \cdot U_r$, as shown in FIG. 2. Referring to FIG. 1, when the second input to limit stage 22 is grounded and $\alpha_2 = 0$, the zero axis in FIG. 3 coincides with the upper reversal point of the sawtooth voltage $U_2$. Referring to FIGS. 2 and 3, a symmetrical sawtooth voltage $U_s$ is obtained when $t_s = t_f$, that is, when the operating time of the rising slope of sawtooth voltage $U_s$ equals the duration time of the falling slope of sawtooth voltage $U_s$ when $R_{11} = R_{16}$ and $R_{13} = R_{14}$ times an amplification factor of 1 for amplifier 15.

FIG. 3 shows the voltages and pulse trains which appear at designated points in the circuit shown in FIG. 1. $U_r$ is the reference voltage or supply voltage applied to voltage divider 10. $U_s$ is the sawtooth voltage at output terminal 21 of integrator 18.

$U_1$ is the pulse train in the form of spikes from limit stage 22. $U_2$ is the pulse train in the form of spikes from limit stage 23. $U_3$ is the auxiliary pulse train supplied from output terminal 24a of NAND-gate 24 in memory stage 26 of sawtooth voltage generator 2 to switching circuit 4 and to switch 12. $U_4$ is the auxiliary pulse train supplied from output terminal 25a of NAND-gate 25 in memory stage 26 of sawtooth voltage generator 2 to switching circuit 4 and to switch 17. $U_5$ is the pulse train produced by comparator stage 3 from sawtooth voltage $U_s$ and supplied to NAND-gate 8. $U_6$ is the pulse train produced by comparator stage 3 from sawtooth voltage $U_s$ and supplied to NAND-gate 9. $U_7$ is the pulse train at the output 4a of memory stage 5 of switching circuit 4 and supplied to inverter converter 1. $U_8$ is the pulse train at output 4b of memory stage 5 of the switching circuit 4 and supplied to inverter converter 1. $U_w$ is the output voltage at output terminal 1b of inverter converter 1.

Referring to FIG. 3, it is assumed that the sawtooth voltage generator 2 produces a symmetrical sawtooth voltage $U_s$. Because of the proportionality of the limiting voltages of regulator amplifier 33 to reference voltage $U_r$, the control voltage $U_v$ from regulator 45 is always between the upper and lower limits of the reversal points of sawtooth voltage $U_s$.

In reference to the pulse trains $U_1$ and $U_2$ the pulses of which are in the form of spikes and which are produced at the outputs of limit stages 22 and 23, the spikes of pulse train $U_1$ corresponds to the upper reversal points of the sawtooth voltage $U_s$ and the spikes of pulse train $U_2$ corresponds to the lower reversal points of the sawtooth voltage $U_s$. These pulse trains $U_1$ and $U_2$ are applied to the memory stage 26. Pulse trains $U_3$ and $U_4$ are obtained from the outputs of memory stage 26. The time of the leading edges of the pulses of pulse train $U_3$ substantially coincides with the time of the spikes of pulse train $U_1$ which is produced from limit stage 22 and substantially corresponds to the upper reversal point of sawtooth voltage $U_s$. The time of the lagging edge of the pulses of pulse train $U_3$ coincides substantially with the time of the spikes of pulse train $U_2$ produced from limit stage 23 and substantially corresponds to the following lower reversal point of sawtooth voltage $U_s$.

Thus, the duration of the auxiliary pulses of auxiliary pulse train $U_3$ is identical to the separation between the upper reversal point and lower reversal point of sawtooth voltage $U_s$ and corresponds to a half period for a symmetrical sawtooth voltage.

Pulse train $U_4$ is complementary to pulse train $U_3$. The time of the leading edge of the pulses of pulse train $U_4$ substantially coincides with the time of the spikes of pulse train $U_2$ which is produced from limit stage 23 and substantially corresponds to the lower reversal points of sawtooth voltage $U_s$. The time of the lagging edge of the pulses of pulse train $U_4$ substantially coincides with the time of the spikes of pulse train $U_1$ produced from limit stage 22 and substantially corresponds to the upper reversal points of sawtooth voltage $U_s$. The auxiliary pulse trains $U_3$ and $U_4$ are used to open and close switches 12 and 17 alternately and in correct phase, permitting the supply of positive or negative voltages to the input of integrator 18. In addition, auxiliary pulse trains $U_3$ and $U_4$ control the NAND-gates 8 and 9 of switching circuit 4 to suppress interruptions in the control pulses 4 A.C. inverter converter 1.

Referring to pulse trains $U_5$ and $U_6$ which are produced by comparator stage 3 at outputs 3a and 3b, the time of pulse trains $U_5$ and $U_6$ corresponds to the crossover points of the sawtooth voltage $U_s$ with the control voltage $U_v$. Referring to pulse train $U_5$ as an example, it can be seen that a sudden change in the control voltage $U_v$ within the duration of a leg of the sawtooth voltage $U_s$ causes several crossover points and therefore an interruption of the pulse. If such a change of the control voltage $U_v$ does not occur, then the pulses of pulse train $U_5$ are symmetrical with respect to the peaks of the sawtooth voltage $U_s$. The pulse trains $U_5$ and $U_6$, which are complementary, are applied to NAND-gates 8 and 9 and to memory stage 5. By means of memory stage 5, the interruptions in pulse trains 5 and 6 are suppressed with the aid of auxiliary pulses $U_3$ and $U_4$. As a result, the pulse trains $U_7$ and $U_8$ which appear at the outputs 4a and 4b of memory stage 5, consist of only one pulse per period of the sawtooth voltage $U_s$.

The pulse trains $U_7$ and $U_8$ are used, for example, to control the controlled rectifiers in the diagonal branches of A.C. inverter converter in a bridge circuit. An unfiltered output voltage $U_w$ is obtained at the output terminal 1b. After appropriate filtering, the output voltage $U_w$ can be fed to a user for example, as a sine wave voltage substantially free of harmonics.

What is claimed is:

1. A control device adapted for use with an inverted converter, said control device comprising: a sawtooth voltage generator which generates a sawtooth voltage having upper and lower reversal points and which generates auxiliary pulse trains; means for generating a comparison voltage; a comparator stage which receives said sawtooth voltage from said sawtooth voltage generator and said comparison voltage from said means, said comparator stage having outputs at which pulse trains are produced; and a switching circuit which receives pulse trains from said comparator stage and auxiliary pulse trains from said sawtooth voltage generator, said pulse trains from said comparator stage being derived from said sawtooth voltage, the auxiliary pulses of said auxiliary pulse train representing the time of said reversal points of said sawtooth voltage, said switching circuit producing pulse trains which contain only one pulse per period of said sawtooth voltage and which are applied to said inverted converter.

2. The control device according to claim 1 wherein said switching circuit comprises two gates and a memory stage, said memory stage of said switching circuit being set by said pulse trains from said comparator stage and said auxiliary pulse trains from said sawtooth voltage generator in only one direction during one leg of said sawtooth voltage and in only the other direction during the following leg of said sawtooth voltage.

3. The control device according to claim 1 wherein said sawtooth voltage generator produces two said auxiliary pulse trains and wherein the duration of the auxiliary pulses of the auxiliary pulse trains from said sawtooth voltage generator substantially correspond to the separation between the reversal points of the sawtooth voltage, the leading edges of the auxiliary pulses of one auxiliary pulse train substantially coinciding with the upper reversal points of the sawtooth voltage and the leading edges of the auxiliary pulses of the other auxiliary pulse train substantially coinciding with the lower reversal points of the sawtooth voltage.

4. The control device according to claim 2 wherein said comparator stage produces two pulse trains and comprises an inverter stage and wherein said switching circuit comprises a first NAND-gate and a second NAND-gate, said first NAND-gate and said second NAND-gate each having two inputs, one pulse train from said comparator stage being applied directly to one input of said first NAND-gate in said switching circuit and the other pulse train from said camparator stage being applied through said inverter stage to one input of said second NAND-gate in said switching circuit, the second input of each said first and second NAND-gates in said switching circuit receiving one of said auxiliary pulse trains from said sawtooth voltage generator and the outputs of said first and second NAND-gates being connected to the inputs of the memory stage of said switching circuit.

5. The control device according to claim 1 wherein said sawtooth voltage generator comprises a first limit stage, a second limit stage and a memory stage, said memory stage of said sawtooth voltage generator producing a first auxiliary pulse train and a second auxiliary pulse train, said first auxiliary pulse train corresponding substantially to the upper reversal points of said sawtooth voltage and said second auxiliary pulse train corresponding substantially to the lower reversal points of said sawtooth voltage, said first limit stage producing a first pulse train and said second limit stage producing a second pulse train, the pulses of said first pulse train corresponding substantially to the upper reversal points of said sawtooth voltage and the pulses of said second pulse train corresponding to the lower reversal points of said sawtooth voltage, said auxiliary pulses being derived from said first and second pulse trains.

6. The control device according to claim 5 wherein said memory stage of said sawtooth voltage generator follows said limit stages.

7. The control device according to claim 1 wherein said sawtooth voltage generator further comprises: an integrator having inputs and an output at which said sawtooth voltage is generated having upper and lower reversal points; a plurality of limit stages which generate pulse trains, the pulses of which correspond to the upper and lower reversal points of said sawtooth voltage; a reference voltage; a first switch and a second switch for transmitting sequentially positive and negative integrator input voltages respectively to the input of said integrator, said input voltages being proportional to a reference voltage said limit stages having respective inputs for receiving respective datum voltages proportional to the reference voltage, said switches being controlled by said pulse trains from said limit stages and said switches being alternately opened and closed whenever a reversal point of said sawtooth voltage is reached.

8. The control device according to claim 7 wherein said sawtooth voltage generator further comprises a first voltage divider to which said reference voltage is applied and from which a voltage is derived, said voltage being at least one of the input voltages applied alternately to the input of said integrator.

9. The control device according to claim 7 and further comprising a second voltage divider to which said reference voltage is applied and from which at least one of said datum voltages from said limit stages is derived.

10. The control device according to claim 7 wherein said sawtooth voltage generator further comprises an inverting amplifier for said integrator, at least one of said input voltages which is applied alternately to said integrator being derived from said inverting amplifier.

11. The control device according to claim 7 and further comprising upper and lower limiting voltages for said comparison voltage and wherein said comparator stage further comprises a first input and a second input, said sawtooth voltage from said sawtooth voltage generator being applied to said first input of said comparator stage, said comparison voltage being applied to the second input of said comparator stage, said comparison voltage being limited by an upper and lower limiting voltages whose magnitude lies between the reversal points of said sawtooth voltage, said upper and lower limiting voltages being proportion to said reference voltage.

12. The control device according to claim 11 wherein said means for generating said comparison voltage is a regulator, said regulator comprising a regulator amplifier and at least one voltage divider, said voltage divider providing said regulator amplifier with limiting voltages to limit said comparison voltage.

13. A method for the control of an inverted converter by use of a control device, comprising: generating a sawtooth voltage and auxiliary pulse trains, the pulses of said auxiliary pulse trains representing the time of the reversal points of said sawtooth voltage; applying said auxiliary pulse trains and pulses derived from said sawtooth voltage to a switching circuit; producing pulse trains from the output of said switching circuit which contain only one pulse per period of the sawtooth voltage; and applying said pulses from the output of said switching circuit to said inverted converter.

* * * * *

UNITED STATES PATENT OFFICE
CERTIFICATE OF CORRECTION

Patent No. 3,792,339    Dated February 12, 1974

Inventor(s) Christian Kublick

It is certified that error appears in the above-identified patent and that said Letters Patent are hereby corrected as shown below:

In column 1, line 19, change "vltage" to --voltage--

In column 7, line 34, change

"$(\alpha_2 + \alpha_3) \cdot U_r = t_s/R_{11} \cdot C \alpha_1 \cdot U_r \, t_s = \alpha_2 + \alpha_3/\alpha_1 \cdot R_{11} \cdot C$" to read $$-- (\alpha_2 + \alpha_3) \cdot U_r = \frac{t_s}{R_{11} \cdot C} \alpha_1 \cdot U_r$$

$$t_s = \frac{\alpha_2 + \alpha_3}{\alpha_1} \cdot R_{11} \cdot C --$$

In column 7, lines 39 and 40, change

"$(\alpha_2 + \alpha_3) \cdot U_r = t_f/R_{16} \cdot C \cdot R_{14}/R_{13} \cdot \alpha_1 \cdot U_r \, t_f = [(\alpha_2 + \alpha_3)/(\alpha_1 \cdot R_{14}/R_{13})] \cdot R_{16} \cdot C$" to read $$--(\alpha_2 + \alpha_3) \cdot U_r = \frac{t_f}{R_{16} \cdot C} \cdot \frac{R_{14}}{R_{13}} \cdot \alpha_1 \cdot U_r$$

$$t_f = \frac{(\alpha_2 + \alpha_3)}{\alpha_1 \cdot \frac{R_{14}}{R_{13}}} \cdot R_{16} \cdot C --$$

In column 12. line 7 (claim 11), change "proportion" to read --proportional--

Signed and sealed this 17th day of September 1974.

(SEAL)
Attest:

McCOY M. GIBSON JR.
Attesting Officer

C. MARSHALL DANN
Commissioner of Patents